US008533127B2

(12) United States Patent
Charroppin

(10) Patent No.: US 8,533,127 B2
(45) Date of Patent: Sep. 10, 2013

(54) DEVICE ALERTING TO EXPIRATION IN A FRANKING SYSTEM

(75) Inventor: Pascal Charroppin, Le Vesinet (FR)

(73) Assignee: Neopost Technologies, Bagneux (FR)

( * ) Notice: Subject to any disclaimer, the term of this patent is extended or adjusted under 35 U.S.C. 154(b) by 1939 days.

(21) Appl. No.: 10/767,143

(22) Filed: Jan. 29, 2004

(65) Prior Publication Data

US 2004/0220889 A1 Nov. 4, 2004

(30) Foreign Application Priority Data

Jan. 31, 2003 (FR) .................................... 03 01161

(51) Int. Cl.
*G06F 17/00* (2006.01)

(52) U.S. Cl.
USPC .................................................. 705/401

(58) Field of Classification Search
USPC .................................................. 705/401
See application file for complete search history.

(56) References Cited

U.S. PATENT DOCUMENTS 4,516,014 A * 5/1985 Eckert ........................... 235/101
5,008,827 A * 4/1991 Sansone et al. ............... 705/409
5,661,653 A * 8/1997 Kulik ............................ 705/410
5,684,990 A * 11/1997 Boothby ............................... 1/1
5,710,706 A * 1/1998 Markl et al. .................. 705/409
5,852,813 A * 12/1998 Guenther et al. ............. 705/408
6,041,319 A * 3/2000 Bass et al. ..................... 705/409
6,321,214 B1 * 11/2001 Thiel ............................. 705/408
6,463,133 B1 * 10/2002 Dlugos et al. .............. 379/93.11
6,615,196 B1 * 9/2003 Kampert et al. .............. 705/410
7,103,583 B1 * 9/2006 Baum et al. .................. 705/409

FOREIGN PATENT DOCUMENTS

DE 198 43 252 3/2000
EP 0 745 958 12/1996
EP 0 911 767 4/1999
EP 1 058 213 12/2000

* cited by examiner

*Primary Examiner* — Shannon Campbell
(74) *Attorney, Agent, or Firm* — Sughrue Mion, PLLC

(57) ABSTRACT

This invention relates to a device alerting to the expiration of tariffs for a franking system, comprising a random access memory (RAM) for recording postal data including a first table of postal tariffs relative to postal products and services and a processing unit for updating these postal tariffs, this RAM further comprising a second table of postal tariffs and the processing unit comprising means for comparing the postal tariffs of the first and second tables and for emitting a message alerting to the expiration of tariffs when a date of application of the postal tariffs of said second table is identical to or earlier than a desired date of franking and when one of these compared postal tariffs has been changed.

10 Claims, 2 Drawing Sheets

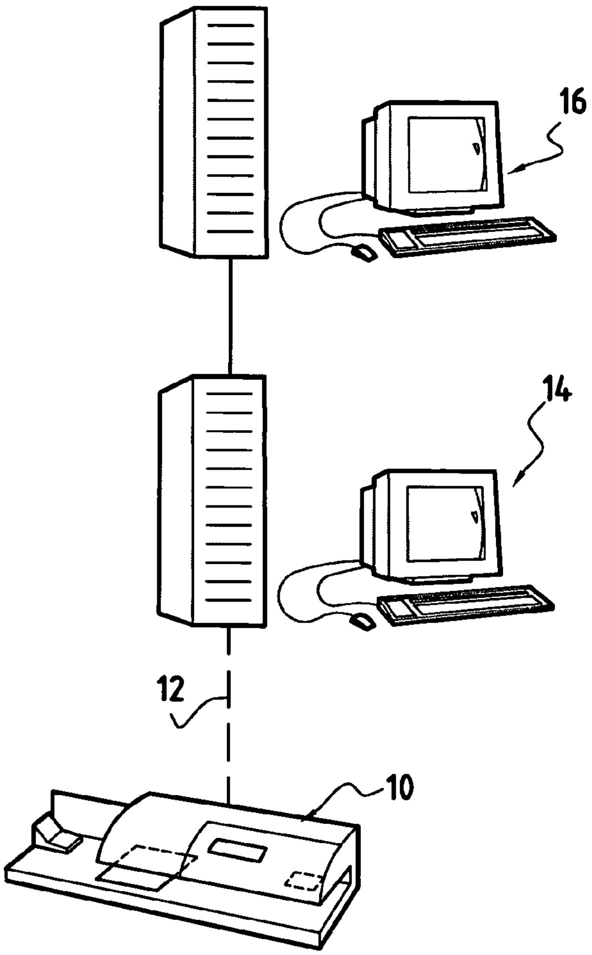
FIG.1
FIG.2
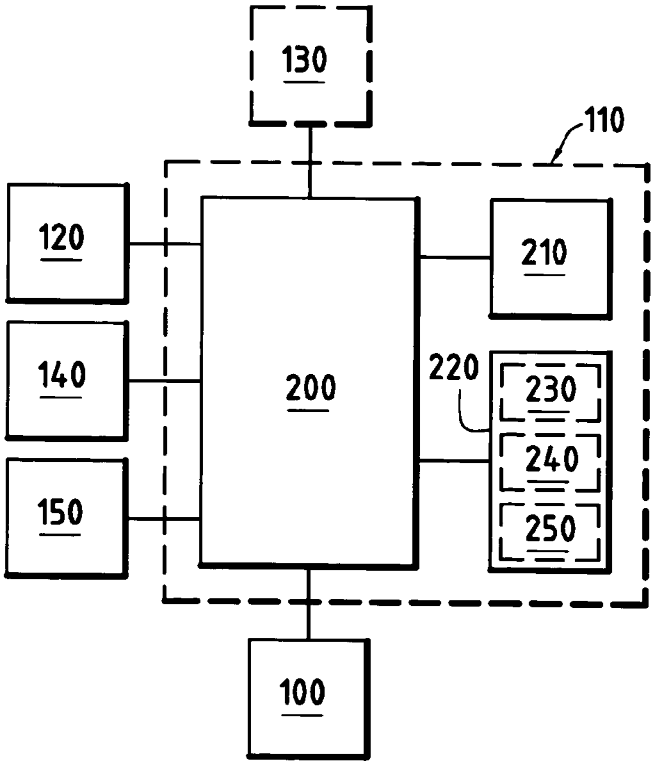

DEVICE ALERTING TO EXPIRATION IN A FRANKING SYSTEM

This application claims benefit of the earlier filed French Application No. 03 01161, filed Jan. 31, 2003.

FIELD OF THE INVENTION

The present invention relates exclusively to the domain of mail handling and more particularly to the updating of postal data in a franking system.

BACKGROUND OF THE INVENTION

It is known that franking systems may comprise a smart card read module allowing the exchange of data by physical transfer between this system and a resetting centre, with a view mainly to allowing the system to be reloaded with credit, or postal data such as the types of products or postal services, or more simply postal tariffs, to be updated.

Now, except for the reloading of funds which the operator is compelled to do if he wishes to proceed with the printing of new postal indicia once his credit is exhausted, the updating of the postal data, particularly the postal tariffs, is not an obligation for the operator who, without necessarily knowing, may therefore continue to use the expired postal tariffs for franking his mail items. Such use is not without risk for this operator whose mail items bearing postal indicia at the expired tariff are in that case likely to be rejected by the Postal Service.

It is therefore an object of the present invention to provide a franking system which overcomes the drawback set forth hereinabove by informing the operator of the need to use new postal tariffs. Another object of the invention is to update the postal tariffs necessary for printing postal indicia, at the operator's request. A further object of the invention is to update the postal products and services associated with the postal indicia.

SUMMARY OF THE INVENTION

These objects are attained by a device alerting to the expiration of tariffs for a franking system, comprising a random access memory (RAM) for recording postal data including a first table of postal tariffs relative to postal products and services and a processing unit for updating these postal tariffs, characterized in that said RAM further comprises a second table of postal tariffs and in that said processing unit comprises means for comparing said postal tariffs of the first and second tables and for emitting to the operator of the franking system a message alerting to the expiration of tariffs when a date of application of said postal tariffs of said second table is identical to or earlier than a desired date of franking and when one of said compared postal tariffs has been changed.

With the invention, the operator will thus always be informed if he is using expired tariffs but he will remain free to apply the new tariffs proposed.

The second table of postal tariffs is loaded in the franking system at a periodicity defined by the Postal Service, for example whenever credit is reloaded. It may be loaded in the franking system from a remote resetting centre.

The invention also relates to the process for alerting to the expiration of tariffs for a franking system comprising a RAM for recording postal data and a processing unit for updating these postal data, said process comprising the following steps:

when a date of application of new postal data previously loaded in the franking system is identical to or earlier than a franking date desired by an operator of the franking system, comparison of these new postal data with current postal data present in the RAM, and emission of a message to the operator of the franking system alerting to the expiration of tariffs if one of the compared postal data has been changed.

The new postal data are preferably stored at the location of the current postal data when the operator has accepted the updating of these postal data and the current postal data are stored in a blank part of the RAM, to be kept for control purposes.

The emission of the message alerting to the expiration of tariffs is advantageously inhibited by the operator except for the first such message after the franking system has been put into operation.

The postal data comprise postal tariffs and/or postal products and services.

BRIEF DESCRIPTION OF THE DRAWINGS

The invention will be more readily understood on reading the following description given by way of non-limiting example, with reference to the accompanying drawings, in which:

FIG. 1 shows a franking system comprising a device according to the invention for alerting to the expiration of tariffs.

FIG. 2 schematically shows the processing means of the franking system of FIG. 1.

DESCRIPTION OF PREFERRED EMBODIMENT

Figure 3:
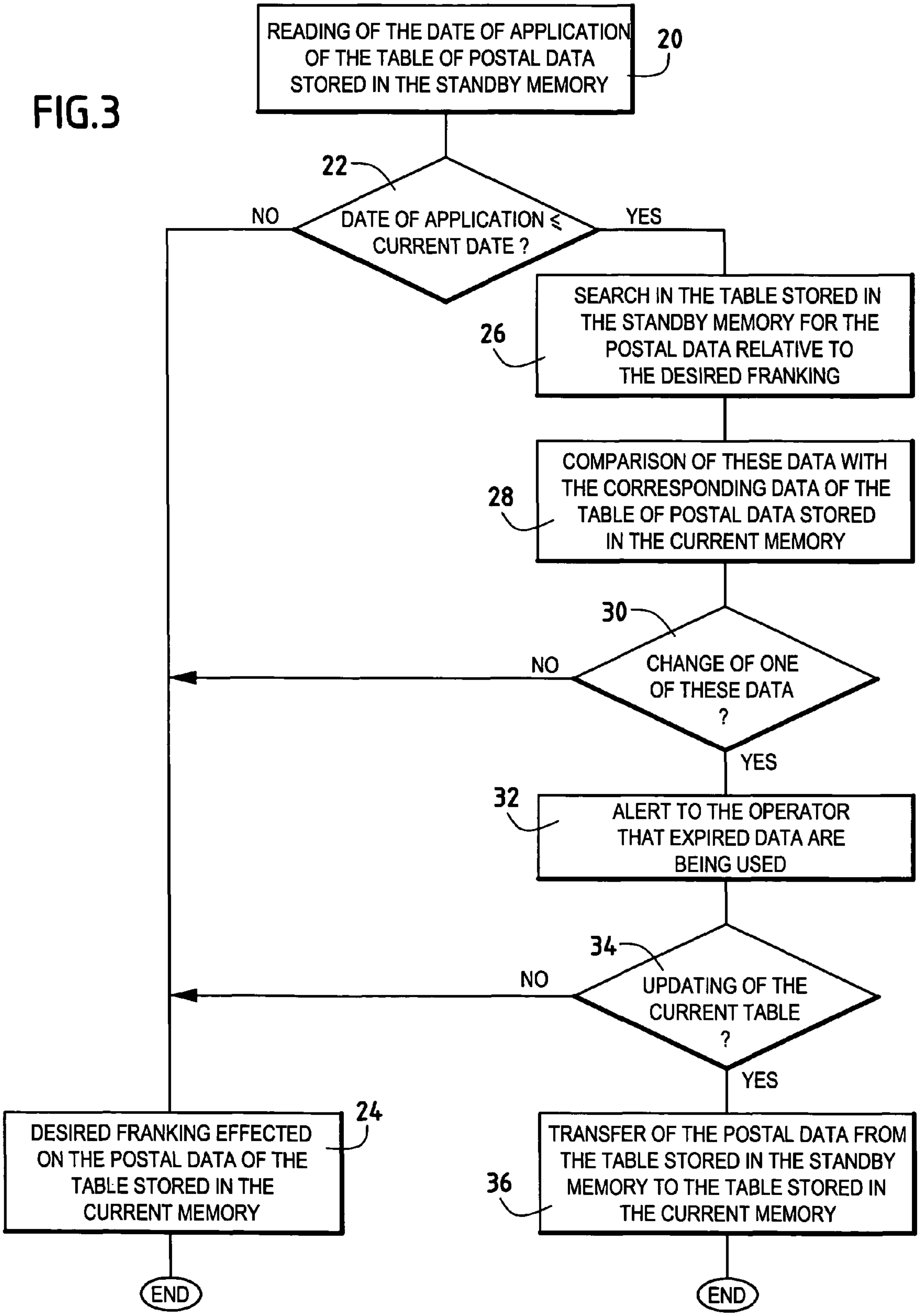
FIG. 3 is a flowchart illustrating the process carried out in the franking system of FIG. 1.

Referring now to the drawings, FIG. 1 shows the architecture of an electronic franking system implementing the present invention, with a franking machine 10 adapted to be connected through a specialized telephone link 12 to a remote resetting centre 14, generally managed by the manufacturer or sole agent of the franking machine, this first resetting centre itself being linked to a second centre 16, in principle a server of the Postal Service.

The internal electronic structure of a franking machine 10 is schematically illustrated in FIG. 2. It conventionally comprises a printing module 100, preferably of inkjet type (although all other known printing means can also be envisaged), controlled from an accounting and control device 110 which receives orders such as the mode of dispatch or the franking amount from an integrated entry member 120 (for example a keyboard) in liaison with a weighing module 130 inside or outside the franking machine. An input/output module 140 ensures the interface with the specialized line 12 and choices of entry options or of accounts rendered may be displayed on an integrated monitoring screen 150.

The accounting/control device which is advantageously in the form of a secured electronic module, comprises a processing unit 200, a programmable read-only memory (PROM) 210 and a RAM 220.

The PROM comprises the instructions necessary for managing the frankings and certain fixed data relative to the user and recorded when the machine is installed (different identification numbers or encryption keys for example).

The RAM contains the temporary data necessary for executing the afore-mentioned instructions, a current postal data table 230, this table including in particular the postal tariffs in force when the machine is installed, and a saved part 240 containing the information necessary for monitoring the frankings such as the franking cycle meter, the ascending/descending meters and the statistics meters necessary for monitoring the postal traffic. In a variant, depending on the configuration of the machine envisaged, the postal data table may also be arranged in this saved part of the RAM.

In practice, present-day accounting and control devices are provided, for security reasons (redundancy), with two back-up RAMs (of flash type) or rewritable memories, which are identical and each have a maximum capacity sufficient to record the different data mentioned above.

According to the invention, the RAM 220 further comprises at least a second postal data table 250 intended for updating the initial table. The loading of this second table is effected at a periodicity defined by the Postal Service. For the postal tariffs, a change generally occurs only every two, three or four years. However, two changes may exceptionally be made in one year. For the postal products or postal services whose list is more evolutive, it is advised to effect a loading periodically, every year for example, or more regularly still, upon every exchange of information between the resetting centre and the electronic franking system, for example when funds are being reloaded.

Similarly, according to the invention, the processing unit 200 further comprises software means for comparing every datum of the second postal data table with the corresponding datum of the initial postal data table and for recording, at the operator's request and against payment, the data of the second table 250 in place of the corresponding data of the first table 230.

The process of management of the current postal data table will now be described with reference to FIG. 3. A new table of postal data will, of course, have previously been loaded in the RAM of the franking system either via the specialized telephone link 12, from the remote resetting centre 14, or manually by smart card (or even by simple exchange of the existing memory module), this new table comprising a date of application for when the postal data that it incorporates are to come into force. In effect, in practice, the loading of this table will always be effected before the date when it effectively comes into force. The RAM 220 therefore comprises, after this loading, a first memory zone comprising the table of postal data in force, which will be called current memory in the following description, and a second memory zone comprising the table of postal data which has just been loaded and its date of application, which will be called standby memory hereinafter.

When a first franking is effected, the data entered via the keyboard relative to the mode of dispatch (urgent, ordinary, registered, etc. . . . ), to the category of mail (parcel, letter weighing less than 20 g, etc. . . . ) and to the destination of this mail item, and possibly the value of weight obtained from the balance, allow the processing unit to determine the postal product or service selected by the user for which the regulation tariff is to be applied. To that end, in a first step 20, the date of application of the postal data table stored in the standby memory is read. In a following step 22, this date of application is compared with the current date which is the date of franking to be borne on the mail article (which may be a date later than that day's date due to a possible post-dating), and if this date of application is later than the current date, the mail item is franked, in a new step 24, with the tariff of the table presently in the current memory, without taking into account the data stored in the standby memory which has therefore not yet effectively come into force.

On the contrary, if the date of application is the current date or an earlier date, the postal data associated with the desired franking are firstly, in a step 26, sought for in the table stored in the standby memory, then, in a step 28, these data are compared with the corresponding data stored in the current memory and, if one of these data has changed (test of step 30), a message is addressed to the operator, in a new step 32, alerting as to the expiration of tariffs (for example via a display means of the franking system), informing him that the postal data used have lapsed and inviting him to change them provided that the credit necessary for paying the corresponding replacement costs (test of step 34) is sufficient. On the contrary, if none of the postal data used for the desired franking have been changed at the level of the table in the standby memory, the desired franking is then effected with the data of the table stored in the current memory (return to step 24).

If the operator responds positively to the test of step 34, the postal data of the standby memory are completely transferred towards the current memory in a following step 36, and the desired franking is therefore effected once this transfer has been effected from the new postal data now accessible from the table stored in the current memory. In parallel, a payment is effected by the accounting device and an account is addressed to the remote centre by the specialized link when such exists. If, on the contrary, the operator responds negatively to the test of step 34, franking is in that case effected with the then expired postal data of the table stored in the current memory (return to step 24).

This process of updating the current memory and of warning the operator is repeated for the following frankings. However, the operator may request (for example at the first franking) that the afore-mentioned warning message (displayed during step 32) not be automatically visualized and therefore inhibited for all the frankings presenting an expired tariff except, however, for the first of them after the franking system has been put into operation.

The invention is very simple and economical to implement and may be applied to electronic franking systems already in service, against an inexpensive software change and a simple increase of its memory capacity. On this subject it will be noted that it may be advantageous not to overwrite the table of postal data of the current memory when it is replaced by the new table of the standby memory, but to keep it in a blank zone of the RAM for control purposes. Similarly, it may be noted that, although the description has been envisaged with one new table, the person skilled in the art may adapt it, without any inventive merit, to the case of a plurality of new tables being successively loaded and present in the standby memory with different dates of application, the comparison of the data in that case being made on those relative to the table having a date of application earlier than the franking date which is the most recent. In that case, an agreement of the operator for updating his current table will bring about an automatic cancellation of all the intermediate tables (those having a date of application before that having to be transferred in the current memory).

What is claimed is:

1. Device alerting to the expiration of tariffs for a franking system, comprising:

- a random access memory (RAM) for recording postal data including:
  - a first table of postal tariffs relative to postal products and services, said first table of tariffs comprising postal tariffs applicable before a date of application, a second table of postal tariffs relative to postal products and services, said second table of tariffs comprising postal tariffs applicable after said date of application; and a processing unit comprising comparing means for comparing one by one postal data in said first table of postal tariffs with corresponding postal data in said second table of postal tariffs, wherein said processing unit further comprises:

means for emitting to the operator of the franking system a message alerting that postal data corresponding to the mail item to be franked has been changed, if it has been determined from said comparison of said postal data that at least one of the postal data corresponding to the mail item to be franked has changed, and means for receiving a decision of the operator whether to replace the postal tariffs of the first table with the postal tariffs of the second table, for updating the postal tariffs at the operator's request, the device further comprising a franking machine which franks the mail item with the current postal data when it has determined that the current postal data has not changed, even though the date of the application of the current postal data is out of date.

2. The device of claim 1, wherein said second table of postal tariffs is loaded in the franking system at a periodicity defined by the Postal Service.

3. The device of claim 1, wherein said second table of postal tariffs is loaded in the franking system from a remote resetting centre.

4. The device of claim 1, wherein said second table of postal tariffs is loaded in the franking system whenever credit is reloaded.

5. Process for alerting to the expiration of tariffs for a franking system comprising a display, a keyboard, a random access memory (RAM) for recording postal data and a processing unit for updating these postal data, said process comprising the following steps:

at a time of franking, when a date of application of new postal data previously loaded in the RAM of the franking system is identical to or earlier than a franking date of a mail item to be franked desired by an operator of the franking system, comparing by the processing unit of the franking system current postal data of the mail item to be franked and present in the RAM one by one with corresponding new postal data to determine whether there is a change in the current postal data;

when it has been determined that the current postal data has changed, displaying a message on the display of the franking system alerting the operator to the expiration of tariffs;

receiving on the keyboard a decision of the operator whether to replace the current postal data with the new postal data; and when it has been determined that the current postal data has not changed, franking the mail item with the current postal data using a franking machine even though the date of application of the current postal data is out of date.

6. The process of claim 5, wherein the new postal data are stored at the location of the current postal data when the operator has accepted the updating of the current postal data.

7. The process of claim 6, wherein the current postal data are stored in a blank part of the RAM, to be kept for control purposes.

8. The process of claim 5, wherein the emission of the message alerting to the expiration of tariffs is inhibited by the operator except for the first such message after the franking system has been put into operation.

9. The process of claim 5, wherein the postal data comprise postal tariffs.

10. The process of claim 5, wherein the postal data comprise postal products and services.

* * * * *